United States Patent [19]

Ingelhag

[11] Patent Number: 5,683,222

[45] Date of Patent: Nov. 4, 1997

[54] METHOD FOR TAKING UP ARTICLES

[75] Inventor: Anders Georg Peder Ingelhag, Göteborg, Sweden

[73] Assignee: Digitron AG, Aarau, Switzerland

[21] Appl. No.: 469,917

[22] Filed: Jun. 6, 1995

[30] Foreign Application Priority Data

Jun. 6, 1994 [CH] Switzerland ............ 01 777/94

[51] Int. Cl.⁶ .................................. B65G 59/02
[52] U.S. Cl. .......................... 414/786; 414/797.2
[58] Field of Search ................ 414/796.6, 796.9, 414/797.2, 797.3, 398, 786

[56] References Cited

U.S. PATENT DOCUMENTS

| | | | |
|---|---|---|---|
| 5,102,292 | 4/1992 | Brinker et al. | 414/796.6 X |
| 5,238,350 | 8/1993 | Krieg et al. | 414/797.2 X |
| 5,265,712 | 11/1993 | Krieg | 198/512 |

FOREIGN PATENT DOCUMENTS

| | | | |
|---|---|---|---|
| 0548545 | 6/1993 | European Pat. Off. | |
| 1907109 | 9/1970 | Germany | |
| 3733461 | 4/1989 | Germany | |
| 49-52265 | 5/1974 | Japan | |
| 60-123277 | 7/1985 | Japan | |
| 1-48724 | 2/1989 | Japan | 414/796.6 |
| 1-99586 | 7/1989 | Japan | |
| 6-87533 | 3/1994 | Japan | |
| 6144574 | 5/1994 | Japan | |
| 6-171762 | 6/1994 | Japan | 414/797.2 |
| 7-69455 | 3/1995 | Japan | |

Primary Examiner—Karen B. Merritt
Assistant Examiner—Janice L. Krizek
Attorney, Agent, or Firm—Greenblum & Bernstein, P.L.C.

[57] ABSTRACT

Method and device for taking up articles. The apparatus or device comprises a vehicle running on tracks and mounted to the vehicle are a tilting member, a receiving table and an intermediate storage portion, with the tilting member tilting an article to be picked up, the receiving table entering the gap therebelow, holding same, retracting same, and transferring same to the intermediate storage portion, with the apparatus being actuated such that the tilting member can already start tilting a next article while the receiving table is still busy with a previous article, and the intermediate storage portion can be operated independently from the receiving table, this making it possible to manipulate several articles simultaneously and to thereby increase the pick-up rate.

4 Claims, 7 Drawing Sheets

METHOD FOR TAKING UP ARTICLES

CROSS REFERENCE TO RELATED APPLICATIONS

This application claims the priority of Swiss Application No. 1777/94-4, filed Jun. 6, 1994, the disclosure of which is incorporated herein by reference in its entirety.

BACKGROUND OF THE INVENTION

1. Field of the Invention

The invention relates to a method and a device or an apparatus for taking up a plurality of articles.

2. Discussion of the Background of the Invention and Material Information

An apparatus of this kind is e.g. required in automated storage plants for servicing shelves or for depalletizing. It should be able to manipulate large quantities of various articles both reliably and quickly.

European Patent Publication EP 548 545 and German Patent Publication DE 1 907 109 describe known devices of this kind. They comprise a tilting member and a receiving table, wherein the tilting member is used to tilt the article somewhat before the receiving table is extended below the article for taking it up. Thereafter, the article is moved onto the receiving table and the entire device is retracted.

The pick up rate of such devices is rather limited. By using optimized tilting members and receiving tables, typical pick up rates, ranging between 220 and 250 articles per hour, can be reached. Higher rates are, however, very desirable.

Hence, it is a general object of the invention to provide an apparatus and a method of this kind that work more quickly than the known solutions without being much more expensive.

SUMMARY OF THE INVENTION

Now, in order to implement these and still further objects of this invention, which will become more readily apparent as the description proceeds, one embodiment of the method for taking up at least two articles, by means of an apparatus which comprises a tilting member and a receiving table, is manifested by the features that in the method, phases A and B are executed cyclically for taking up the articles, wherein during a first phase A the tilting member is positioned at a first one of the articles and tilts the first article and, during a first phase B the receiving table is extended below the first article for taking up the first article, and wherein during a next phase A the tilting member is positioned at a next one of the articles and tilts the next article while the receiving table retracts the first article and moves it to a dispatch station where the first article is moved off the receiving table, and during a next phase B the receiving table is extended below the next article for taking up the next article.

In another embodiment of the invention, the apparatus for taking up at least two articles is manifested by the features that it comprises a tilting member for tilting the articles to be taken up, a receiving table that is extendable towards the articles to be taken up and a holding member, the holding member being independently movable relative to the tilting member and being vertically movable from above onto the articles to be taken up.

In yet another embodiment of the invention the apparatus for taking up at least two articles is manifested by the features that it comprises a tilting member that is vertically displaceable and extendable horizontally towards the articles to be taken up, a receiving table being extendable horizontally towards the articles to be taken up and being located below the tilting member, and a holding member, the holding member being independently movable relative to the tilting member and being vertically movable from above onto the articles to be taken up.

In the present invention the tilting member and the receiving table can now work independently, with a "phase shift" between their movements. While the receiving table and the holding member are still busy with taking up and retracting a first article, the tilting member can already prepare a next article. This increases the pick-up rate with only minor modifications in the apparatus.

Preferably, the tilting member is provided with a measuring device for the determination of the position of each article to be taken up. This allows the measurement of the article's position before tilting same. Due to the phase-shifted operation of the receiving table and the tilting member, there is sufficient time for this measurement, in phase A, without delaying the taking up process.

For a further increase of the pick up rate, the apparatus can be provided with an intermediate storage portion for receiving articles from the receiving table. Articles can be fed to this intermediate storage portion at a high rate. Preferably, several articles at a time are moved in a group from the intermediate storage portion or station to a removal device, e.g. while the apparatus is moved to a new pick-up position.

By providing the apparatus with a holding member that supports the taking up process of the receiving table and allowing this holding member to be moved independently from the tilting member, the receiving table and the holding member can take up a first article while the tilting member is already tilting the next article.

In order to keep the construction of the apparatus as simple as possible, the holding member and the receiving table should preferably have a common drive mechanism for both horizontal and/or vertical displacement thereof.

The previously noted intermediate storage portion should preferably be displaceable in the vertical direction so that it can receive articles from the receiving table and then move same down to a removal device located at the bottom of the apparatus.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
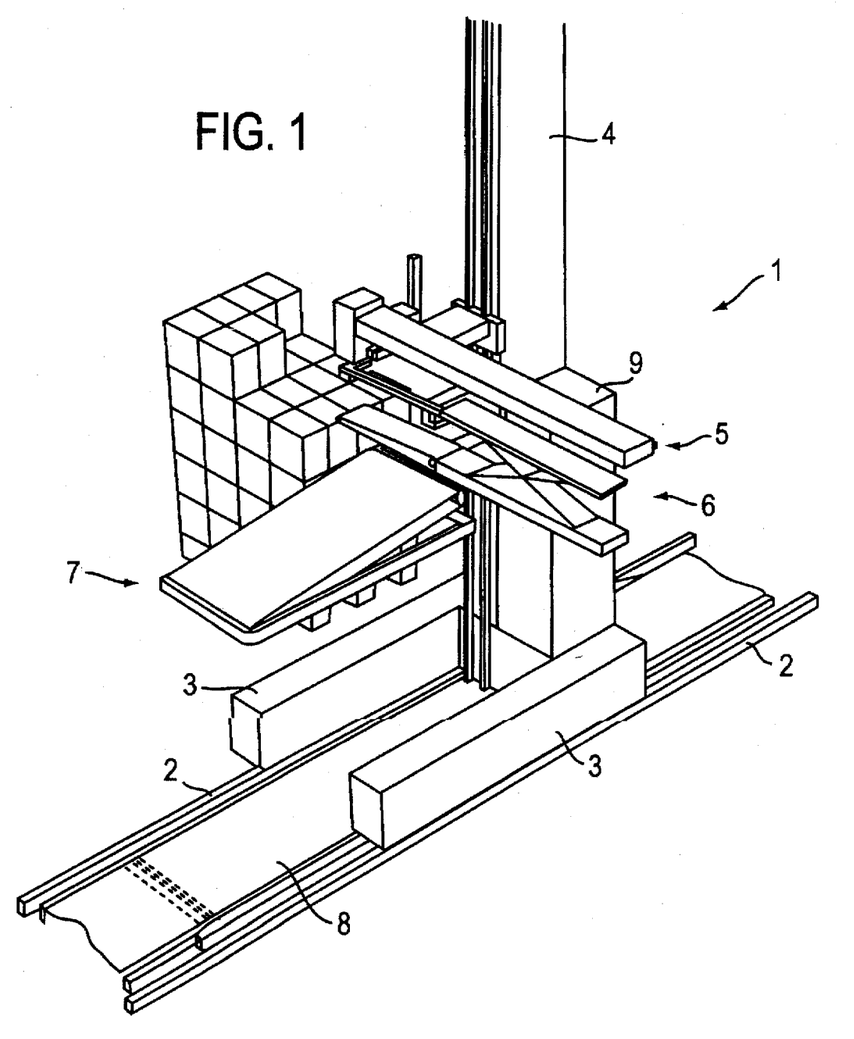
FIG. 1 is a perspective view of an apparatus according to the present invention.

The basic setup of the apparatus or device of this invention is shown in FIG. 1 and comprises a vehicle 1 that can be driven along tracks 2. Vehicle 1 has a lower carriage 3 and a tower or upright 4 mounted thereupon having a height of about e.g. 2 to 6 meters. Mounted on tower 4 are three units 5, 6, 7, each of which can be displaced individually in the vertical direction. The topmost unit is a tilting member 5, while therebelow a receiving table 6 is mounted and the lowest unit is an intermediate storage portion 7. The design and function of these units will be described in more detail hereinafter.

A conveyor belt 8 is arranged below vehicle 1, between tracks 2, and serves as a removal device for removing the articles to a central distribution station.

A housing 9 of vehicle 1 also includes a resident computer for controlling the operation of the apparatus of this invention.

Figure 2:
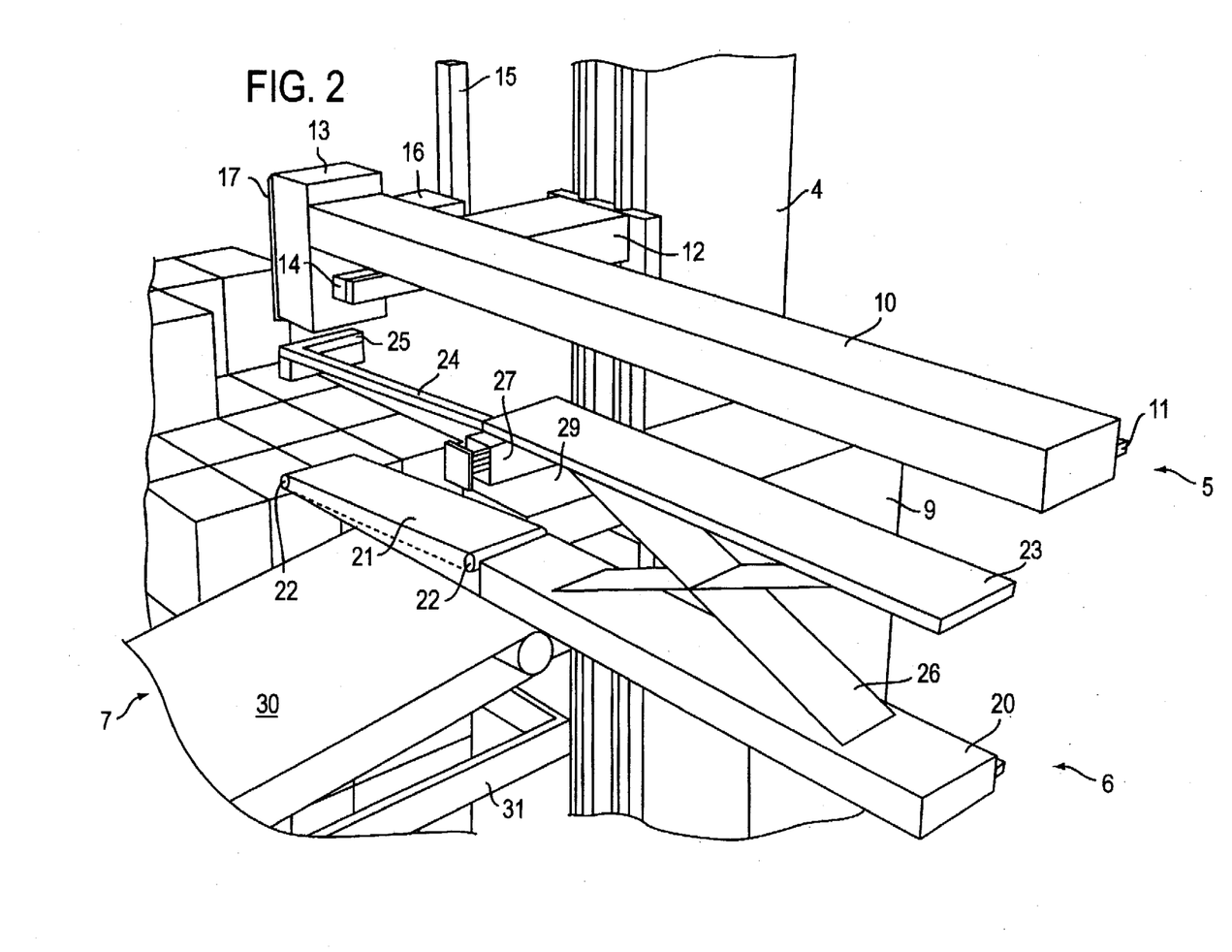
FIG. 2 shows a detail of FIG. 1.

The most important parts of vehicle 1 are shown in FIG. 2.

Tilting member 5 comprises a first or horizontal arm 10 having a track 11 actuated via a horizontal drive unit or mechanism 12. In an alternate embodiment (not illustrated) tilting member 5 (as well as receiving table 6) can be displaced telescopically.

A measuring device 13 is located at the head or leading end of horizontal arm 10 and permits the determination of the position of an article placed therebelow. Preferably, this position determination is carried out by known optical methods using laser illumination, although other methods or systems can be utilized. Furthermore, a tilting arm or member 14 is also arranged near the head of horizontal arm 10 and is equipped with a drive mechanism for moving same both vertically and horizontally with respect to horizontal arm 10. Of this drive mechanism, only a vertical drive motor 16 and a vertical bar 15, displaced by drive motor 16, can be seen in FIG. 2, with the drive mechanism for tilting member 14 further comprising a horizontal drive motor and a horizontal bar, both of which are designed in a manner similar to those of drive motor 16 and bar 15, but not visible in FIG. 2. Such drive mechanisms are known to a person skilled in the art and can e.g. be based on electrical, pneumatic or hydraulic principles.

A plate 17 is arranged on the front side or ahead of measuring device 13 and can be displaced vertically by means of any desired conventional driving mechanism (not shown).

Receiving table 6 is arranged vertically below tilting member 5 and rests on a second arm 20, which is provided with a track 28 actuated via a further horizontal drive motor 29. The horizontal drive mechanism or unit of receiving table 6 is therefore substantially identical to the horizontal drive mechanism of tilting member 5. On its forward end, facing the articles to be taken up, arm 20 is equipped with an endless conveyor belt 21, which is driven over spaced rollers 22. A holding member, including items 23–25, is mounted on top of arm 20 and an elevator mechanism 26 is provided for vertically displacing holding member 23–25 with respect to arm 20. On its forward or front end, holding member 23–25 terminates in a holding arm 25, which is connected to its rearward part 23 by means of a bar 24.

Bar 24 is so laterally arranged such that holding arm 25 and tilting arm 14 are not obstructed in their movements as will be described hereinafter.

An ejection mechanism 27 is laterally mounted on receiving table 6 and can be used for ejecting an article positioned in front thereof from receiving table 6 onto the intermediate storage portion 7.

Intermediate storage portion 7 consists of a slightly inclined conveyor 30 arranged on a frame 31, with frame 31 being mounted on tower or upright 4 by a vertical driving mechanism (not visible in FIG. 2).

The operation of the apparatus will now be explained with reference to FIGS. 3 to 16, wherein the movements of the apparatus are indicated by directional arrows.

Figure 3:
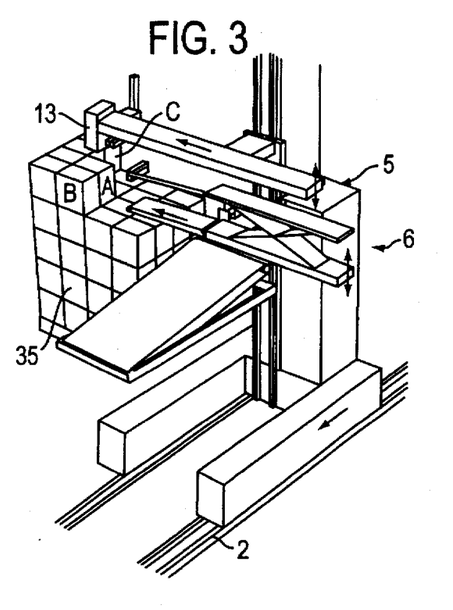
FIGS. 3–16 illustrate consecutive steps of the operation of the apparatus of FIG. 1 while taking up articles.

FIG. 3 shows the apparatus before taking up three articles A, B and C from a stack of articles 35. Before starting the taking up sequence, vehicle 1 must be moved along tracks 2 to be in front of the theoretical position of first article A. Receiving table 6 is positioned vertically so as to be located slightly higher then the top surface of the next lower articles. The height of tilting member 5 is so chosen such that it is assured that measuring device 13 is higher than the top surface of article A.

Now, tilting member 5 is extended towards the articles and measures the exact position of article A by means of measuring device 13, and if necessary, the position of vehicle 1 and/or tilting member 5 is then corrected. At the same time horizontal displacement of receiving table 6 towards the articles can begin.

Figure 4:
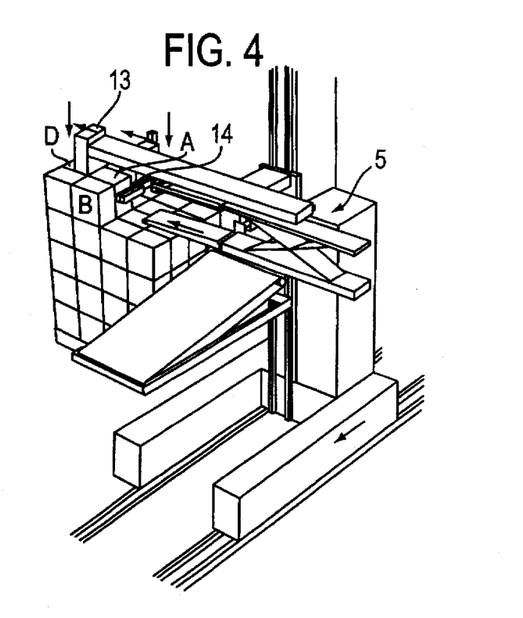

As shown in FIG. 4, tilting arm 5 is now extended further and measuring device 13 is pressed into contact with article D, located behind article A. Tilting arm 14 is lowered and then moved towards article A until it comes into contact with the upper part of its vertical (forward) surface facing the apparatus.

Figure 5:
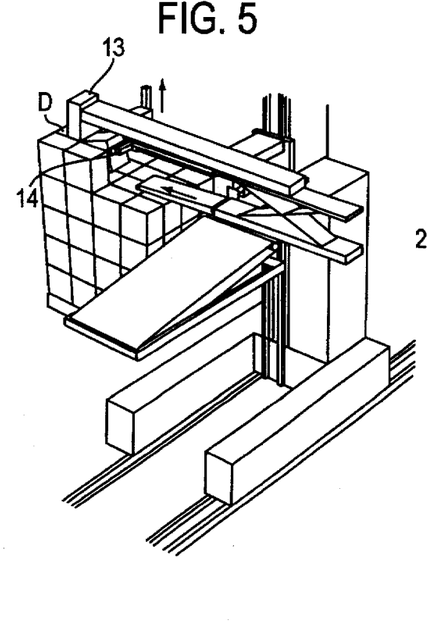

FIG. 5 shows the next step, where tilting arm 14 is moved upwardly again while still being pressed against the vertical surface of article A. In this way a frictional force, with an upward directed component, is exerted to article A, which tilts same about its upper rear edge, i.e. about the upper edge facing away from apparatus 1. At the same time, measuring device 13 is pressed onto article D to prevent it from being pushed away. In order to increase the frictional forces exerted by measuring device 13 and tilting arm 14, these parts are provided with suitable surface layers of rubber or other similar materials.

Figure 6:
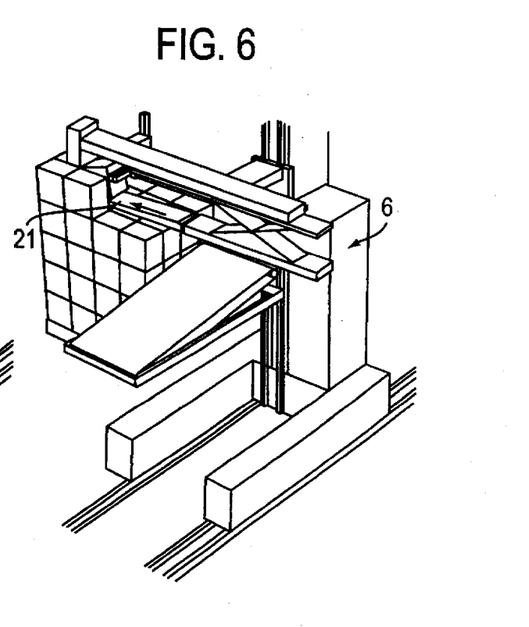

Once article A has been tilted, as shown in FIG. 6, receiving table 6 is extended further such that its forward end, including conveyor 21, moves below article A. At the same time, conveyor 21 is driven such that its upper portion has a velocity that is equal but opposite to the velocity of receiving table 6 and therefore stands still with respect to article A.

Figure 7:
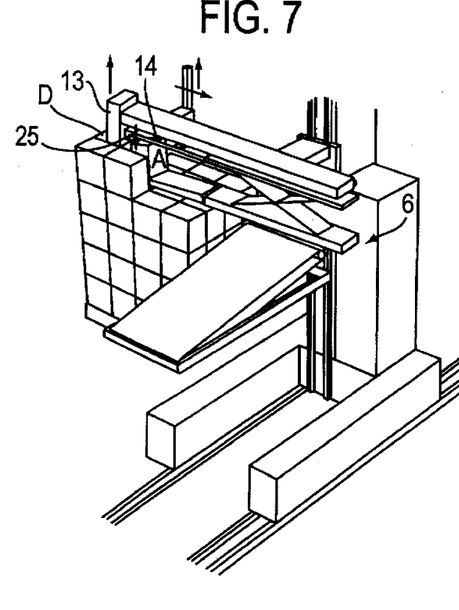

FIG. 7 shows the next step of the taking up or acquisition procedure. As soon as receiving table 6 has entered the gap below article A, tilting arm 14 is no longer required and is moved backwards and upwards. Once receiving table 6 has reached its maximum extension, holding arm 25 is lowered onto article A, from above, in order to hold same. Now, article D can be released via the lifting of measuring device 13.

Figure 8:
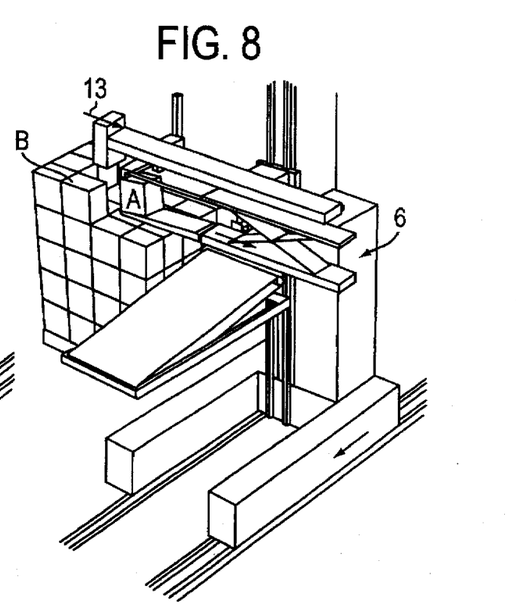

In FIG. 8, receiving table 6 is retracted while conveyor 21 stands still. At the same time, vehicle 1 is moved laterally to the expected position of the next article B. Measuring device 13 is positioned above article B and determines its exact position.

Figure 9:
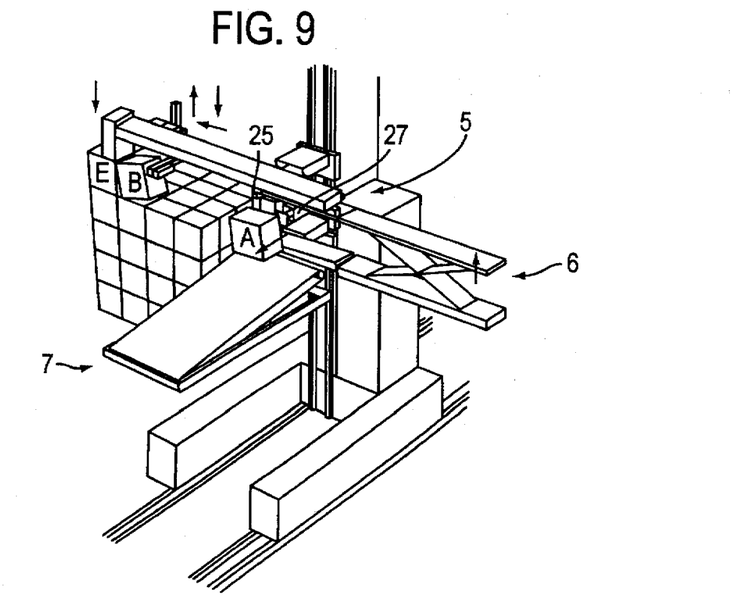

Then, as shown in FIG. 9, measuring device 13 is lowered onto article E, located behind article B. It will prevent a displacement of article E while article B is taken up. Tilting arm 14 is lowered, pressed against the vertical surface of article B and lifted, thereby tilting article B. While tilting member 5 is already working on article B, receiving table 6 is retracted until article A arrives beside ejection mechanism 27. As soon as it has reached this dispatch station, ejection mechanism 27 is actuated to push article A onto intermediate storage position 7.

Figure 10:
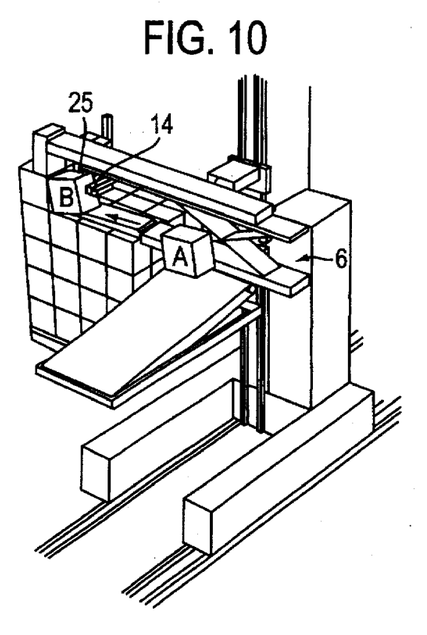
Figure 11:
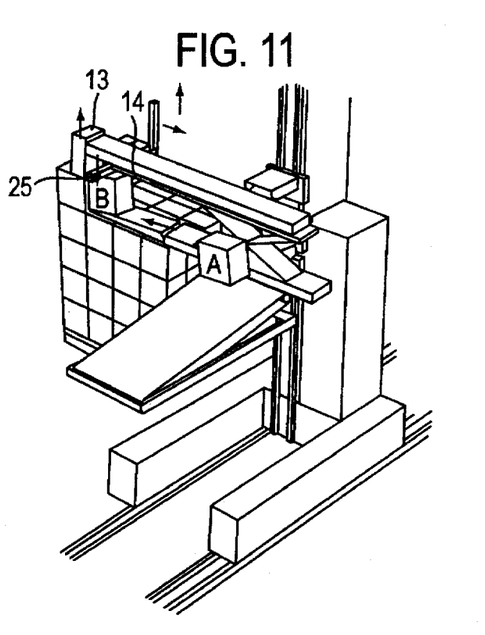

As shown in FIG. 10, receiving table 6 can now again be extended so as to enter the gap below tilted article B. Tilting arm 14 is moved back and upwards again.

As soon as receiving table 6 has fully entered the gap below article B (FIG. 11), holding arm 25 is lowered onto article B and holds same. Measuring device 13 is then lifted from article E.

Figure 12:
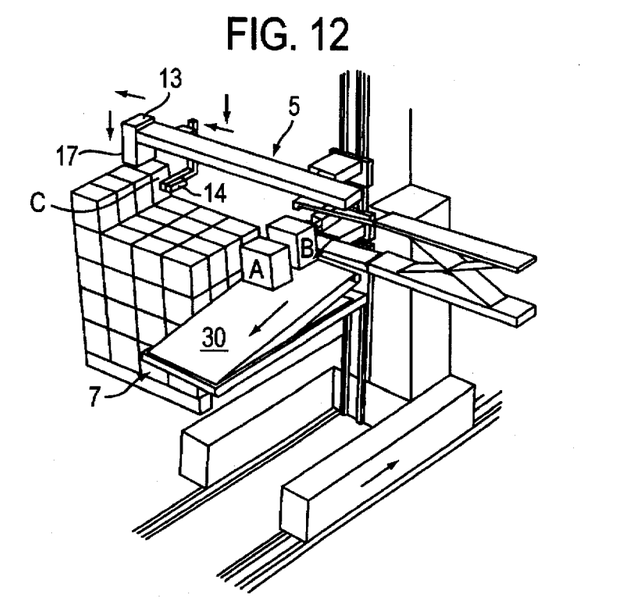

In a next step, shown in FIG. 12, an article C located in the rearmost row of stack 35, is to be taken up. For this purpose, vehicle 1 is displaced on its tracks 2 such that receiving table 6 is located in front of article C. At the same time, article B is moved to the dispatch station where it is moved onto intermediate storage portion 7 by means of ejection mechanism 27. Conveyor 30, of intermediate storage portion 7 is actuated in order to move article A downwardly and to make room for article B. At the same time, measuring device 13 is positioned above article C and determines its position. Then, plate 17 is lowered behind article C. Tilting arm 14 is then pressed against the vertical forward face of article C while plate 17 behind article C prevents the article from being pushed away.

Figure 13:
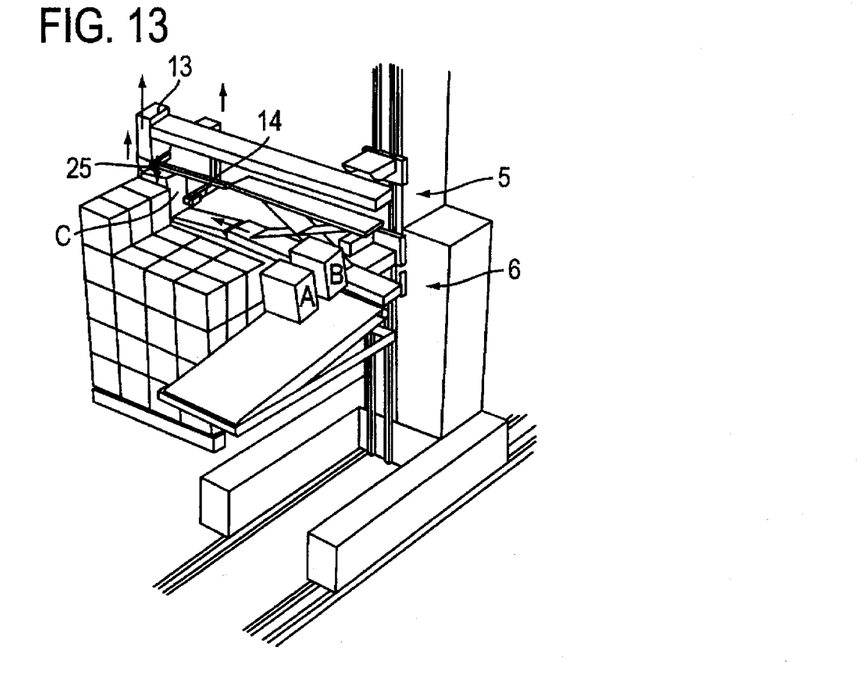

In FIG. 13, article C is tilted by the lifting of tilting arm 14. At the same time, measuring device 13 and the entire tilting member 5 are lifted slightly, such that there is sufficient room for holding member 25 between the top face of article C and measuring device 13. Receiving table 6 is then extended and grabs article C. Tilting arm 14 and plate 17 are thereafter moved away from article C.

Figure 14:
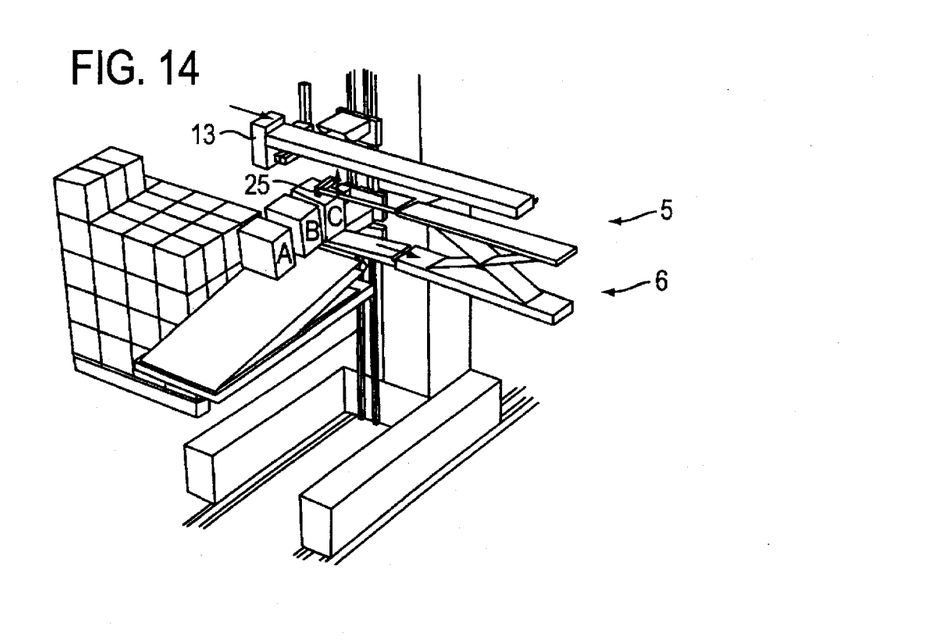

It is assumed that the next articles are to be taken or removed from a next stack. Therefore, tilting member 5, as well as receiving table 6, can now be retracted as shown in FIG. 14. Thus, article C arrives at the dispatch station where holding arm 25 is lifted.

Figure 15:
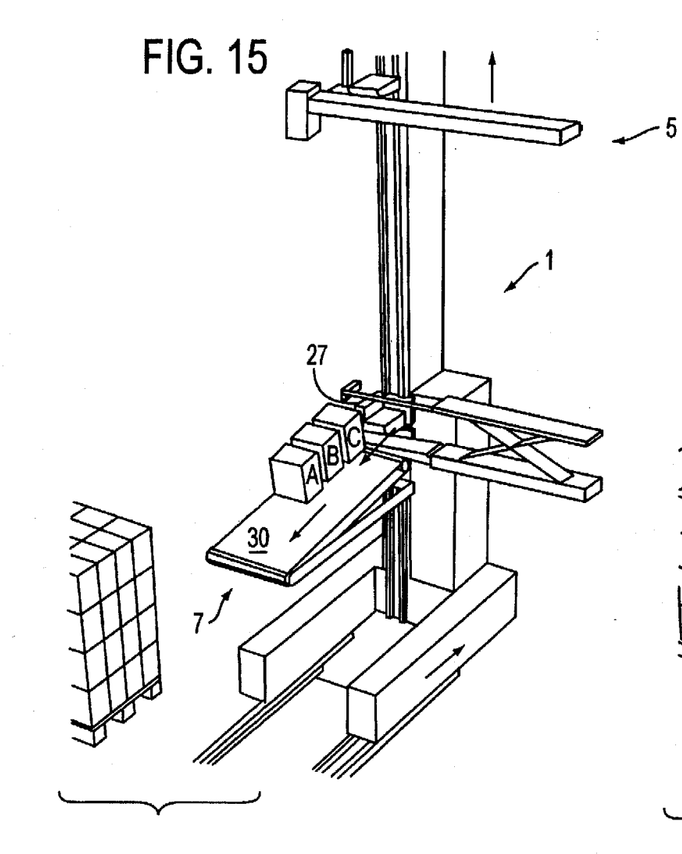

Ejection mechanism 27 is actuated to push article C onto intermediate storage portion 7, as shown in FIG. 15. Conveyor 30, of intermediate storage portion 7, is actuated to make room for article C. At the same time, vehicle 1 is moved laterally to the next stack and tilting member 5 is lifted to a corresponding new working position.

Figure 16:
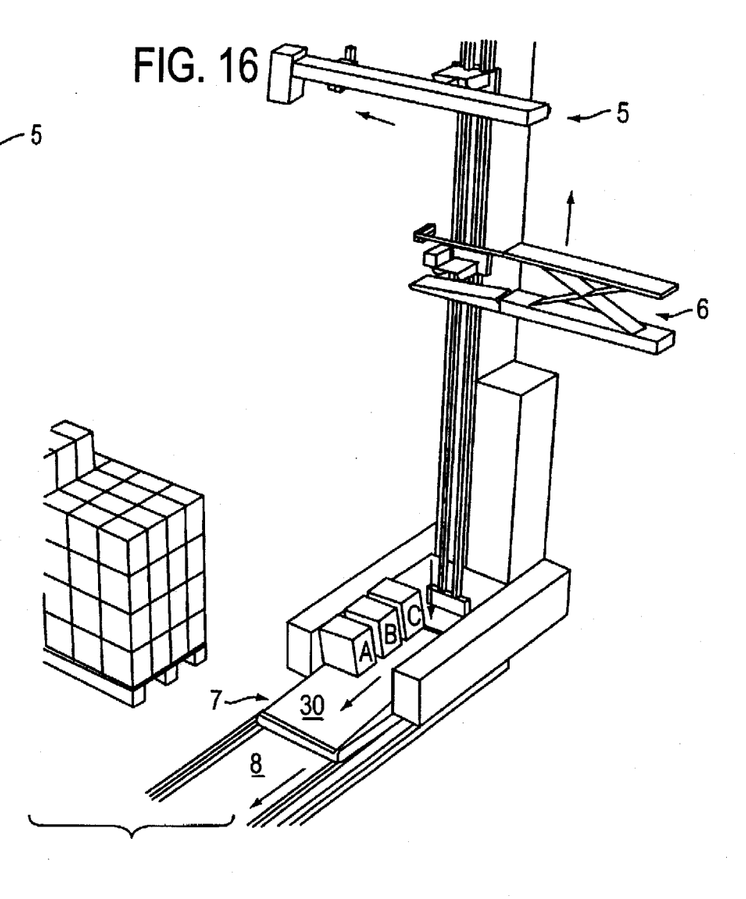

In FIG. 16, article C has arrived on intermediate storage portion 7. Now, intermediate storage portion 7 can be lowered to the bottom of vehicle 1. Once there, conveyor 30 is actuated to move articles A, B, C, in a group, onto conveyor 8. This can also occur while vehicle 1 is still in motion. Once the articles have left intermediate storage portion 7, it can be lifted back to receiving table 6.

As soon as article C was moved onto intermediate storage portion 7, receiving table 6 was also lifted to a new working height.

Once the vehicle has reached the position of the next stack of articles (not shown), tilting member 5 is extended for tilting the next article.

In conclusion, it has been shown that tilting member 5 and receiving table 6 work nearly independently. While receiving table 6 is still busy with retracting a first article, tilting member 5 is already moved to the next article, measures its position and tilts same. Therefore, in a first working phase A, as it is e.g. shown in FIGS. 3–5, 8, 9 and 12, an article is measured by measuring device 13 and tilted by tilting arm 14 while, if there is an earlier article on receiving table 6, receiving table 6 is retracted to move the earlier article to the dispatch position. In a second working phase B, illustrated in FIGS. 6 and 10, the gap below the article, previously lifted by tilting arm 14 is entered by receiving table 6. While taking up several articles, working phases A and B are repeated cyclically. During these phases, the operation of receiving table 6 and tilting member 5 must only be in synchronism during phases B while the two units can work independently during phases A. Therefore, two articles can be manipulated simultaneously during each phase A. In phase B, which can be short in duration in comparison with phase A, an article moves from the responsibility of tilting member 5 to the responsibility of receiving table 6.

A further increase in the pick-up rate can be reached by quickly moving the articles from receiving table 6 into intermediate storage portion 7. After this transferal, receiving table 6 and intermediate storage portion 7 can work independently. Intermediate storage portion 7 can e.g. be lowered to conveyor 8 while receiving table 6 is moved to its next working position (see FIG. 16) or while receiving table 6 fetches a next article from the stack.

By sequential manipulation of the articles in two or three steps, respectively, and by keeping the transferal times between the units 5, 6 and 7 short, a high parallelism and a correspondingly high pick-up rate of e.g. 400 articles per hour is reached. Still, there is more time for the individual working steps such that it is e.g. possible to measure the position of an article before tilting same. This increases the reliability of the apparatus and its tolerance for badly placed articles.

For supporting the parallel operation, each unit (tilting member 5, receiving table 6 and intermediate storage portion 7) is designed such that it executes all of its tasks, except transferal, independently from the other units. For this purpose receiving table 6 is provided with holding arm 25 such that it can hold the article without the help of tilting member 5. Furthermore, all units 5, 6, 7 are provided with their own horizontal and vertical driving mechanisms.

Transferal of the articles between the individual units should be as quick as possible. In the embodiments shown here, transferal between receiving table 6 and intermediate storage portion 7 is quick because the article needs only to be displaced over the width of the receiving table. This can be done quickly and efficiently by means of ejection mechanism 27.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A method for taking up at least two articles by means of an apparatus, wherein said apparatus includes a tilting member and a receiving table, said method comprising phases A and B, executed cyclically, for taking up articles, said method comprising:

positioning, during a first phase A, said tilting member at a first one of said articles and tilting said first article;

extending in a first direction, during a first phase B, said receiving table below said first article for taking up said first article;

positioning, during a next phase A, said tilting member at a next one of said at least two articles and tilting said next article while retracting said receiving table and said first article, in a direction opposite said first direction, and moving same to a dispatch station where said first article is moved off said receiving table, and;

extending, during a next phase B, said receiving table below said next article for taking up said next article.

2. The method of claim 1 further including: determining, during said phases A, a position of said article to be taken up by a measuring device of said tilting member.

3. The method of claim 1 further including: moving said articles from said dispatch station to an intermediate storage station during said next phase A for temporarily storing said articles before further processing.

4. The method of claim 3 further including: moving said articles in groups from said intermediate storage station.

* * * * *